(12) United States Patent
Minta et al.

(10) Patent No.: US 7,147,124 B2
(45) Date of Patent: Dec. 12, 2006

(54) CONTAINERS AND METHODS FOR CONTAINING PRESSURIZED FLUIDS USING REINFORCED FIBERS AND METHODS FOR MAKING SUCH CONTAINERS

(75) Inventors: Moses Minta, Sugar Land, TX (US); Ronald R. Bowen, Magnolia, TX (US)

(73) Assignee: Exxon Mobil Upstream Research Company, Houston, TX (US)

( * ) Notice: Subject to any disclaimer, the term of this patent is extended or adjusted under 35 U.S.C. 154(b) by 262 days.

(21) Appl. No.: 10/396,895

(22) Filed: Mar. 25, 2003

(65) Prior Publication Data

US 2003/0183638 A1 Oct. 2, 2003

Related U.S. Application Data

(60) Provisional application No. 60/367,824, filed on Mar. 27, 2002.

(51) Int. Cl.
*F17C 1/12* (2006.01)
*F17C 1/14* (2006.01)
*B63B 25/14* (2006.01)
*B63B 25/16* (2006.01)

(52) U.S. Cl. ............ 220/560.07; 220/560.08; 220/560.09; 220/586; 114/74 A

(58) Field of Classification Search ........ 220/586–590, 220/581, 560.04, 560.07, 560.08, 560.09; 62/45.1–54.3; 114/74 A, 74 R
See application file for complete search history.

(56) References Cited

U.S. PATENT DOCUMENTS

| | | | |
|---|---|---|---|
| 2,004,074 A | 6/1935 | Kiley | |
| 2,795,937 A | 6/1957 | Sattler et al. | |
| 2,940,268 A | 6/1960 | Morrison | |
| 3,150,794 A | 9/1964 | Schlumberger et al. | |
| 3,228,550 A | 1/1966 | Krenzke | |
| 3,232,725 A | 2/1966 | Secord et al. | |
| 3,298,805 A | 1/1967 | Secord et al. | |
| 3,312,575 A | 4/1967 | Corbin, Jr. | |
| 3,321,347 A | 5/1967 | Price et al. | |
| 3,508,677 A | 4/1970 | Laibson et al. | |
| 3,547,302 A * | 12/1970 | Massac et al. | 220/560.08 |
| 3,558,000 A | 1/1971 | McCann et al. | |
| 3,692,601 A | 9/1972 | Goldsworthy et al. | |
| 3,830,180 A | 8/1974 | Bolton | |
| 3,843,010 A | 10/1974 | Morse et al. | |
| 3,864,918 A | 2/1975 | Lorenz | |
| 3,874,544 A | 4/1975 | Harmon | |
| 3,895,152 A | 7/1975 | Carlson et al. | |
| 3,908,851 A | 9/1975 | Jacobs | |
| 3,929,247 A * | 12/1975 | Borup | 114/74 A |
| 3,969,812 A | 7/1976 | Beck | |
| 4,024,720 A | 5/1977 | Dimentberg et al. | |

(Continued)

FOREIGN PATENT DOCUMENTS

CA  2299755  2/2000

(Continued)

OTHER PUBLICATIONS

Roger Ffooks, *Natural Gas By the Sea, The Development of a New Technology*, published 1983 (second edition) by Witherby & Co. Ltd., Chapter 14, especially pp. 162-164 and 175-176.

(Continued)

*Primary Examiner*—Gary E. Elkins

(57) ABSTRACT

Containers suitable for storing pressurized fluids at cryogenic temperatures of −62° C. (−80° F.) and colder are provided and comprise a self-supporting liner and load-bearing composite overwrap, whereby means are provided for substantially preventing failure of the container during temperature changes.

17 Claims, 6 Drawing Sheets

U.S. PATENT DOCUMENTS

| | | | |
|---|---|---|---|
| 4,073,400 A | 2/1978 | Brook et al. |
| 4,182,254 A | 1/1980 | Secord |
| 4,220,255 A | 9/1980 | Tonnessen |
| 4,266,958 A | 5/1981 | Cummings |
| 4,300,354 A | 11/1981 | Buchs et al. |
| 4,315,407 A | 2/1982 | Creed et al. |
| 4,374,478 A | 2/1983 | Secord |
| 4,452,162 A * | 6/1984 | Harbaugh | 114/74 A |
| 4,459,929 A | 7/1984 | Ffooks |
| 4,671,831 A | 6/1987 | Mohan |
| 4,835,975 A | 6/1989 | Windecker |
| 5,084,219 A | 1/1992 | Sigur |
| 5,150,812 A | 9/1992 | Adams |
| 5,199,266 A | 4/1993 | Johansen |
| 5,211,306 A | 5/1993 | Delonge-Immik et al. |
| 5,287,987 A | 2/1994 | Gaiser |
| 5,325,894 A | 7/1994 | Kooy et al. |
| 5,338,383 A * | 8/1994 | Polackowyj | 220/560.05 |
| 5,385,263 A | 1/1995 | Kirk et al. |
| 5,419,139 A | 5/1995 | Blum et al. |
| 5,429,693 A | 7/1995 | Rose |
| 5,484,098 A | 1/1996 | Anttila et al. |
| 5,499,739 A | 3/1996 | Greist, III et al. |
| 5,518,141 A | 5/1996 | Newhouse et al. |
| 5,577,630 A | 11/1996 | Blair et al. |
| 5,658,013 A | 8/1997 | Bees et al. |
| 5,695,839 A | 12/1997 | Yamada et al. |
| 5,758,796 A | 6/1998 | Nishimura et al. |
| 5,762,119 A | 6/1998 | Platz et al. |
| 5,798,156 A | 8/1998 | Mitlitsky et al. |
| 5,803,005 A | 9/1998 | Stenning et al. |
| 5,822,838 A | 10/1998 | Seal et al. |
| 5,878,814 A | 3/1999 | Breivik et al. |
| 5,950,453 A | 9/1999 | Bowen et al. |
| 6,085,528 A | 7/2000 | Woodall et al. |
| 6,145,692 A | 11/2000 | Cherevatsky |
| 6,190,481 B1 * | 2/2001 | Iida et al. | 156/175 |
| 6,460,721 B1 | 10/2002 | Bowen et al. |
| 6,547,092 B1 * | 4/2003 | Chervatsky | 220/581 |

FOREIGN PATENT DOCUMENTS

| | | |
|---|---|---|
| GB | 1522609 | 8/1978 |
| WO | WO 90/00589 | 1/1990 |
| WO | WO 98/59085 | 12/1998 |
| WO | WO 99/32837 | 7/1999 |

OTHER PUBLICATIONS

R. J. Broeker, "A New Process for the Transportation of Natural Gas", International LNG Conference, Chicago, Apr. 1968, Session No. 5, Paper No. 30.

C. P. Bennett, "Marine Transportation of LNG at intermediate temperature", CME, Mar. 1979, pp. 63-64.

E. K. Faridany et al., "The Ocean Phoenix Pressure-LNG System", Gastech 1976, pp. 267-280.

E. K. M. Faridany et al., "A Pressure LNG System", European Offshore Petroleum Conference & Exhibition, Oct. 21-24, 1980, vol. EUR 171, pp. 245-254.

R. J. Broeker, "CNG and MLG-New Natural Gas Transportation Process", American Gas Journal, Jul. 1969, vol. 198, No. 8, pp. 45, 48, and 50.

Prof. E. Fluggen and Dr. I. H. Backhaus, "Pressurised LNG—and the Utilisation of Small Gas Fields", Gastech 78 LNG/LPG Conference (Monte Carlo, Nov. 7-10, 1978) Proceedings, pp. 195-204.

S. G. Ladkany, "Composite Aluminum-Fiberglass Epoxy Pressure Vessels for Transportation of LNG at Intermediate Temperature", published in *Advances in Cryogenic Engineering, Materials*, vol. 28, (Proceedings of the 4th International Cryogenic Materials Conference), San Diego, CA, USA, Aug. 10-14, 1981, pp. 905-913.

L. Conder and N. L. Newhouse, "Cyclic pressure test of a filament-wound vessel containing liquid nitrogen", Cryogenics, Dec. 1980, pp. 697-701.

* cited by examiner

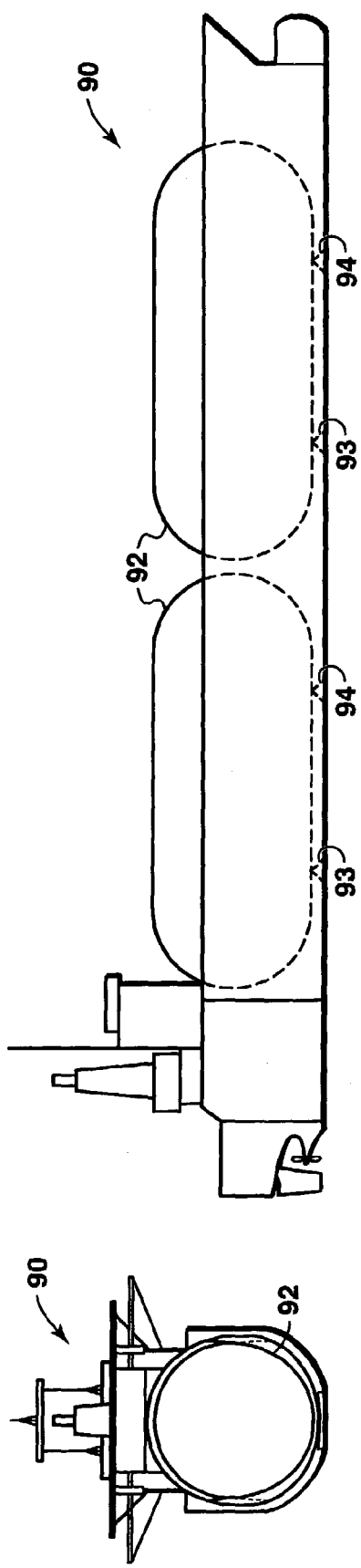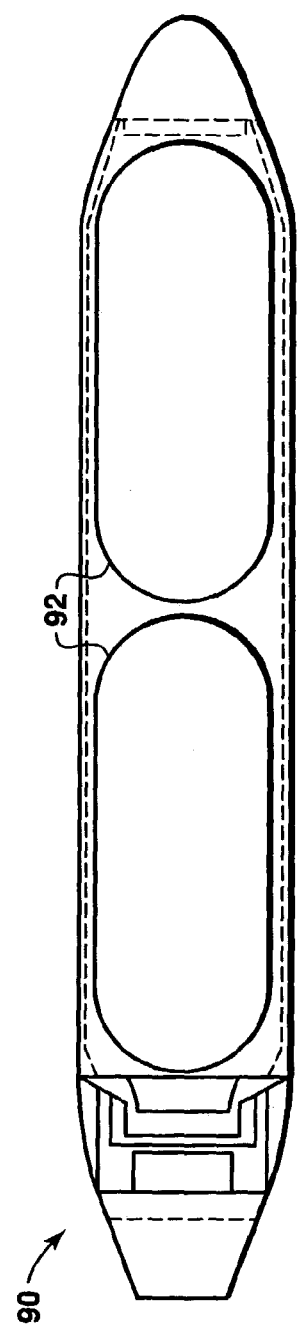
FIG. 7B
FIG. 7C
FIG. 7A ized Liquefied Natural Gas", describes
containers and transportation vessels for storage and marine
transportation of pressurized liquefied natural gas (PLNG) at
a pressure in the broad range of about 1035 kPa (150 psia)
to about 7590 kPa (1100 psia) and at a temperature in the
broad range of about −123° C. (−190° F.) to about −62° C.
(−80° F.). Containers described in the Non-load-bearing
Liner Container Patent are constructed from (a) a load-
bearing vessel made from a composite material, said vessel
being suitable for withstanding pressures of about 1035 kPa
(150 psia) to about 7590 kPa (1100 psia) and temperatures
of about −123° C. (−190° F.) to about −62° C. (−80° F.); and
(b) a substantially non-load-bearing liner in contact with
said vessel, said liner providing a substantially impermeable
barrier to said pressurized liquefied natural gas. The PLNG
Patent, the Process Component Patent, and the Non-load
bearing liner Container Patent are hereby incorporated
herein by reference.

CONTAINERS AND METHODS FOR CONTAINING PRESSURIZED FLUIDS USING REINFORCED FIBERS AND METHODS FOR MAKING SUCH CONTAINERS

This application claims the benefit of U.S. Provisional Application No. 60/367824, filed Mar. 27, 2002.

FIELD OF THE INVENTION

The present invention relates to improved containers and methods for containing pressurized fluids and to methods for making such containers. More particularly, the present invention relates to containers comprising a self-supporting liner and a load-bearing composite overwrap, whereby means are provided for substantially preventing container failure during changes in temperature between ambient and about −123° C. (−190° F.), and to methods for containing pressurized fluids using such containers and to methods of making such containers. In some embodiments, the present invention relates to improved containers and methods for storing pressurized liquefied natural gas (PLNG).

BACKGROUND OF THE INVENTION

Various terms are defined in the following specification. For convenience, a Glossary of terms is provided herein, immediately preceding the claims.

U.S. Pat. No. 6,085,528 (the "PLNG Patent") entitled "Improved System for Processing, Storing, and Transporting Liquefied Natural Gas", describes containers and transportation vessels for storage and marine transportation of pressurized liquefied natural gas (PLNG) at a pressure in the broad range of about 1035 kPa (150 psia) to about 7590 kPa (1100 psia) and at a temperature in the broad range of about −123° C. (−190° F.) to about −62° C. (−80° F.). Containers described in the PLNG Patent are constructed from ultra-high strength, low alloy steels containing less than 9 wt % nickel and having tensile strengths greater than 830 MPa (120 ksi) and DBTTs (a measure of toughness, as defined in the Glossary) lower than about −73° C. (−100° F.). As discussed in the PLNG Patent, at the preferred operating pressures and temperatures of the invention described therein, about 3½ wt % nickel steel can be used in the coldest operating areas of a PLNG plant for the process piping and facilities, whereas more expensive 9 wt % nickel steel or aluminum is generally required for the same equipment in a conventional LNG plant (i.e., a plant for producing LNG at atmospheric pressure and about −162° C. (−260° F.)). Preferably, high strength, low alloy steels with adequate strength and fracture toughness at the operating conditions of the PLNG plant, are used to construct the piping and associated components (e.g., flanges, valves, and fittings), pressure vessels, and other equipment of the PLNG plant in order to provide economic advantage over a conventional LNG plant. U.S. Pat. No. 6,212,891 the ("Process Component Patent") entitled "Process Components, Containers, and Pipes Suitable For Containing and Transporting Cryogenic Temperature Fluids", describes process components, containers, and pipes suitable for containing and transporting cryogenic temperature fluids. More particularly, the Process Component Patent describes process components, containers, and pipes that are constructed from ultra-high strength, low alloy steels containing less than 9 wt % nickel and having tensile strengths greater than 830 MPa (120 ksi) and DBTTs lower than about −73° C. (−100° F.). U.S. Pat. No. 6,460,721 (the "Non-load-bearing Liner Container Patent"), entitled "Systems And Methods For Producing And Storing Pressur The PLNG Patent and the Process Component Patent utilize ultra-high strength, low alloy steels as the connecting theme between the PLNG plant and the containers used for storing and transporting the PLNG. If use of the steels for constructing the containers did not provide a commercially viable means for storing and transporting the PLNG on marine vessels, then any use of the steels in the plant would be meaningless since there would be no mechanism for commercially transporting the PLNG produced by the plant. Conversely, while use of the steels in the PLNG plant generates some economic savings over conventional LNG operations, the most substantial economic benefit is derived from the enormous simplification (and consequent cost reductions) in the plant. Because of its relatively simple design, the PLNG plant is substantially cheaper than a conventional LNG plant of similar capacity. Additionally, while use of the steels in the PLNG transportation system is commercially viable and does generate some economic savings over conventional LNG operations, the weight of the steel containers is high compared to that of its PLNG cargo, resulting in a relatively low cargo-carrying capacity performance factor (PF). The PF for compressed fluid storage containers relates the pressure exerted by the cargo (P) to the volume (V) of the container and the weight (W) of the container by the equation PF=PV/W. What is currently missing from the all-steel PLNG system (i.e., plant plus transportation) is a combination of the PLNG plant with a low cost, higher PF, container-based transportation system that is capable of handling PLNG.

High-performance fibers, which offer high strength-to-weight ratios, are used to construct lightweight composite-overwrapped pressure vessels. Such lightweight pressure vessels have been used extensively in the aerospace industry and for life-support systems such as emergency breathing apparatus for professional firefighters, miners, and rescue workers. These pressure vessels are also used for portable oxygen for medical applications and for flight crew and passengers. Seal et al. (U.S. Pat. No. 5,822,838) describe the two primary technologies used in the design of such high-pressure gas containment systems. The first approach, the most prevalent, uses thin metallic liners (e.g. aluminum) that yield during the service cycle because each pressure cycle results in fiber/composite strain higher than the yield strain (or elastic capability) of the liner. This generally limits the cycle life of the liner and hence of the pressure vessel. In this approach, the liner is non-load bearing; it provides essentially no contribution to carrying the structural load, but only serves as a gas-permeation barrier for the pressure vessel. Such liners are typically bonded to the composite. In the second approach, a material with a higher elastic range relative to the fiber strain during the pressure service is selected for the liner. This increases the liner life since the liner remains elastic during the operating pressure cycles. The liner is also required to share the structural load and is therefore characterized as load-bearing. Typically, the composite is applied only in the hoop direction since the liner must be thick enough to operate in the elastic range. Seal et al. prefer a titanium liner. Both U.S. Pat. No. 5,577,630 (Blair et al.) and U.S. Pat. No. 5,798,156 (Mitlitsky et al.) describe lined, composite pressure vessels for storing and transporting compressed natural gas.

Use of such composite-overwrapped pressure vessels in cryogenic service introduces another problem inherent in the design due to the difference in the CTE, or coefficient of thermal expansion or contraction, of the liner material and the composite. Typical values of CTE are about $-5.6 \times 10^{-7}$ m/m/K ($-1 \times 10^{-6}$ in/in/° F.) for carbon fiber composite, about $3.3 \times 10^{-6}$ m/m/K ($6 \times 10^{-6}$ in/in/° F.) for glass fiber composite, and about $7.2 \times 10^{-6}$ m/m/K ($13 \times 10^{-6}$ in/in/° F.) for aluminum. As a typical composite pressure vessel is cooled to cryogenic temperatures, the liner, which is typically aluminum, tends to contract more than the composite material causing the liner to separate from the windings and subsequently causing pre-mature failure. Innovative approaches to address the CTE problem are the subject of several patents, e.g., U.S. Pat. No. 4,835,975 (Windecker), U.S. Pat. No. 3,830,180 (Bolton), and U.S. Pat. No. 4,073,400 (Brook et al). For example, Windecker (U.S. Pat. No. 4,835,975) proposes using a low-carbon steel liner (having a CTE of about $3.1 \times 10^{-6}$ m/m/K ($5.5 \times 10^{-6}$ in/in/° F.)) and fiberglass composite which have comparable CTE's to avert the problem.

U.S. Pat. No. 3,830,180 ("Bolton") discusses use of a double-walled, composite cylindrical vessel configuration for transport of regular LNG, i.e., LNG at atmospheric pressure and at temperatures of about −162° C. (−260° F.). However, the load-bearing, inner wall of Bolton's vessel is designed for a maximum pressure of approximately 0.34 to 0.41 MPa (50 to 60 psi) and, thus, Bolton's vessel is not suitable for transport and storage of PLNG. Further, Bolton does not discuss liner material but proposes the use of a plastic material, such as FRP pipe (fiber reinforced plastic pipe), or other suitable material "capable of enduring exposure and stress at cryogenic temperatures" for construction of the inner and outer walls of the vessel; however use of FRP necessitates use of a liner since the resin for the FRP will micro-crack at cryogenic temperatures and will not be impermeable to the product, as will be familiar to those skilled in the art.

S. G. Ladkany, in "Composite Aluminum-Fiberglass Epoxy Pressure Vessels for Transportation of LNG at Intermediate Temperature", published in *Advances in Cryogenic Engineering, Materials*, volume 28 (*Proceedings of the 4th International Cryogenic Materials Conference*), San Diego, Calif., USA, Aug. 10, 1981–Aug. 14, 1981, discusses the design of pressure vessels for the transportation of liquefied natural gas (LNG) at temperature and pressure conditions between the critical conditions, 191 K, 4.69 MPa (−116° F., 680 psi) and atmospheric conditions 106 K, 0.1 MPa (−268° F., 14.7 psi). Ladkany's design consists of a 47 mm (1.85 inch) thick aluminum vessel circumferentially reinforced with 17 mm (0.67 in) thick layers of high strength fiberglass epoxy or 51 mm (2 in) thick layers of pultruded glass polyester overwrap and stiffened against buckling by circumferential frames that are placed at 2.16 m (7.1 ft) intervals. The stiffening frames are also used for structurally supporting and fastening the free-standing vessel during transportation and operation. The metal liners for the hoop-wound pressure vessel are load-sharing and are not bonded to the composite overwrap. Stiffening frames are therefore required for buckling resistance, which adds to the complexity of the design and limits the size of the pressure vessel. Ladkany opts for a welded aluminum pressure vessel for containing the intermediate temperature LNG.

U.S. Pat. No. 5,499,739 (Greist, III et al.) discusses a thermoplastic liner made of a modified nylon 6 or nylon 11 material for use in a pressure vessel to control gas permeation and allow operation at low temperatures, the low end of which is stated to be −40° C. (−40° F.). U.S. Pat. No. 5,658,013 (Bees et al.) discusses a fuel tank for vehicles for holding and dispensing both a liquid and gaseous fuel, and suggests that fully-composite or fiberglass reinforced materials could be used in construction thereof. The liquid fuels discussed in the patent are conventional liquid fuels at ambient temperature and pressure. Both Bees et al. and Mitlitsky et al., previously discussed, propose metal-coated, polymer-based liners that provide further enhancements in performance factors of their tanks/vessels. However, the complexity and hence high cost of the metal deposition process and the liner fabrication process make the tanks/vessels of Bees et al. and Mitlitsky et al. suitable primarily for applications where maximized payload-carrying capacity is the primary objective and, thus, low tank/vessel weight is of very high premium. U.S. Pat. No. 5,695,839 (Yamada et al.) discusses a composite container that has a gas barrier property, wherein the packaging material for constituting such a container is caused to have a laminate structure, and a layer of a material such as an aluminum foil is disposed or interposed in the laminate structure. However, none of the containers discussed in these publications are designed for containing fluids that are at both temperatures less than −40° C. (−40° F.) and high pressures, such as the temperatures and pressures of PLNG.

Conventional liquefied natural gas ("LNG") is typically transported by sea at temperatures of about −162° C. (−260° F.) and at atmospheric pressure using spherical or close-to-spherical tanks (often called Moss Spheres) made of aluminum or steel capable of cryogenic service. The service pressure for these spherical tanks is too low for PLNG application. Designing very large tanks for the PLNG service pressure using conventional materials presents fabrication challenges due to the unusually large material thicknesses required. Containers for storing and transporting PLNG as described in the PLNG Patent are constructed from ultra-high strength, low alloy steels. However, in spite of the high strength of the steels used in the construction of the PLNG containers described in the PLNG Patent, the weight of a containment system using these containers will be high relative to the cargo and will constrain the ship design through parameters such as draft and stability. Further, these containers will likely be cylindrical in shape and have small diameters, relative to a typical Moss Sphere LNG container, and thus will likely require interconnection with cryogenic-grade materials into a smaller number of containers to simplify loading and unloading. Furthermore, the arrangement of the cylindrical containers will likely affect the geometric design of the ship affecting the ship block coefficient and hence increasing the power requirement, and obstructing the line-of-sight from the engine room. As used herein, the ship block coefficient is defined as V/(L)(B)(T) where V is the volume of fluid displaced by the ship, L is the length between the ship's perpendiculars, B is the ship's beam and T is the ship's draft.

The Non-load-bearing Liner Patent proposes an alternative containment system design based on lightweight, high-performance composite containers with non-load-bearing liners. The reduced weight enhances the ship design by removing weight-related constraints. However, the fabrication complexity of thin-lined composite containers limits the size and geometry of the containers and thereby increases the complexity of piping requirements and impact on geometric design of the ship.

In spite of the aforementioned advances in technology, even those providing systems and methods for producing and storing pressurized liquefied natural gas (PLNG), it would be advantageous to have improved containers and methods for storing and transporting PLNG.

Therefore, an object of this invention is to provide such improved containers and methods. Other objects of this invention will be made apparent by the following description of the invention.

SUMMARY OF THE INVENTION

In one embodiment of this invention, a container suitable for storing a pressurized fluid at a pressure of about 1035 kPa (150 psia) to about 7590 kPa (1100 psia) and at a temperature of about −123° C. (−190° F.) to about −62° C. (−80° F.) is provided, said container comprising: (a) a self-supporting liner, said self-supporting liner providing a substantially impermeable barrier to said pressurized fluid; and (b) a load-bearing vessel in contact with said self-supporting liner, said load-bearing vessel having been made from composite materials and being suitable for withstanding pressures of about 1035 kPa (150 psia) to about 7590 kPa (1100 psia) and temperatures of about −123° C. (−190° F.) to about −62° C. (−80° F.), and said composite materials having a coefficient of thermal expansion (i) that is substantially the same as the coefficient of thermal expansion of said self-supporting liner at the interface with said self-supporting liner, and (ii) that gradually decreases through the thickness of said load-bearing vessel as the distance from said interface increases. In one embodiment, said load-bearing vessel of said container has an outermost overwrap layer consisting essentially of carbon fibers or of a material that provides similar creep performance as carbon fibers would provide. In another embodiment, element (b) of said container is replaced with the following: (b) a load-bearing vessel in contact with said self-supporting liner, said load-bearing vessel having been made from composite materials and being suitable for withstanding pressures of about 1035 kPa (150 psia) to about 7590 kPa (1100 psia) and temperatures of about −123° C. (−190° F.) to about −62° C. (−80° F.), and said composite materials comprising an intermediate material at the interface with said self-supporting liner, wherein said intermediate material has adequate shear strength or strain to substantially prevent failure of said container during changes in temperature between ambient and about −123° C. (−190° F.). In another embodiment, said self-supporting liner of said container is made of a material consisting essentially of aluminum and element (b) is replaced with the following: (b) a load-bearing vessel in contact with said self-supporting liner, said load-bearing vessel having been made from composite materials and being suitable for withstanding pressures of about 1035 kPa (150 psia) to about 7590 kPa (1100 psia) and temperatures of about −123° C. (−190° F.) to about −62° C. (−80° F.), said composite materials comprising fibers selected from the group consisting of (i) carbon, (ii) glass, (iii) kevlar®, (iv) aramid, and (v) Ultra-High Molecular Weight Polyethylene. In another embodiment, said self-supporting liner of said container is made of a material consisting essentially of a steel having a yield strength of at least about 690 MPa (100 ksi) and a ductile to brittle transition temperature lower than about −62° C. (−80° F.) in the base material and in its heat-affected-zone after welding and element (b) is replaced with the following: (b) a load-bearing vessel in contact with said self-supporting liner, said load-bearing vessel having been made from composite materials and being suitable for withstanding pressures of about 1035 kPa (150 psia) to about 7590 kPa (1100 psia) and temperatures of about −123° C. (−190° F.) to about −62° C. (−80° F.), said composite materials comprising fibers selected from the group consisting of (i) carbon, (ii) glass, (iii) kevlar®, (iv) aramid, and (v) Ultra-High Molecular Weight Polyethylene.

In another embodiment of this invention, a container suitable for storing a pressurized liquefied natural gas at a pressure of about 1035 kPa (150 psia) to about 7590 kPa (1100 psia) and at a temperature of about −123° C. (−190° F.) to about −62° C. (−80° F.) is provided, said container comprising: (a) a self-supporting liner, said self-supporting liner providing a substantially impermeable barrier to said pressurized liquefied natural gas; and (b) a load-bearing vessel in contact with said self-supporting liner, said load-bearing vessel having been made from composite materials and being suitable for withstanding pressures of about 1035 kPa (150 psia) to about 7590 kPa (1100 psia) and temperatures of about −123° C. (−190° F.) to about −62° C. (−80° F.), and said composite materials having a coefficient of thermal expansion that is substantially the same as the coefficient of thermal expansion of said self-supporting liner at the interface with said self-supporting liner.

Also provided is a method of making a container suitable for storing a pressurized fluid at a pressure of about 1035 kPa (150 psia) to about 7590 kPa (1100 psia) and at a temperature of about −123° C. (−190° F.) to about −62° C. (−80° F.), said method comprising the steps of: (a) constructing a self-supporting liner, said self-supporting liner being suitable for providing a substantially impermeable barrier to said pressurized fluid; and (b) overwrapping said self-supporting liner with adequate composite materials to form a load-bearing vessel in contact with said self-supporting liner, said load-bearing vessel being suitable for withstanding pressures of about 1035 kPa (150 psia) to about 7590 kPa (1100 psia) and temperatures of about −123° C. (−190° F.) to about −62° C. (−80° F.), and said composite materials having a coefficient of thermal expansion (i) that is substantially the same as the coefficient of thermal expansion of said self-supporting liner at the interface with said self-supporting liner, and (ii) that gradually decreases through the thickness of said load-bearing vessel as the distance from said interface increases. In another embodiment, step (b) of said method is replaced with the following: (b) overwrapping said self-supporting liner with adequate composite materials to form a load-bearing vessel in contact with said self-supporting liner, said load-bearing vessel being suitable for withstanding pressures of about 1035 kPa (150 psia) to about 7590 kPa (1100 psia) and temperatures of about −123° C. (−190° F.) to about −62° C. (−80° F.), and said composite materials comprising an intermediate material at the interface with said self-supporting liner, wherein said intermediate material has adequate shear strength or strain to substantially prevent failure of said container during changes in temperature between ambient and about −123° C. (−190° F.). In another embodiment of said method, said self-supporting liner of step (a) is made of a material consisting essentially of aluminum and step (b) is replaced with the following: (b) overwrapping said self-supporting liner with adequate composite materials to form a load-bearing vessel in contact with said self-supporting liner, said load-bearing vessel being suitable for withstanding pressures of about 1035 kPa (150 psia) to about 7590 kPa (1100 psia) and temperatures of about −123° C. (−190° F.) to about −62° C. (−80° F.), said composite materials comprising fibers selected from the group consisting of (i) carbon, (ii) glass, (iii) kevlar®, (iv) aramid, and (v) Ultra-High Molecular Weight Polyethylene. In another embodiment of said method, said self-supporting liner of step (a) is made of a material consisting essentially of a steel having a yield strength of at least about 690 MPa (100 ksi) and a ductile to brittle transition temperature lower than about −62° C. (−80° F.) in the base material and in its heat-affected-zone after welding and step (b) is replaced with the following: (b) overwrapping said self-supporting liner with adequate composite materials to form a load-bearing vessel in contact with said self-supporting liner, said load-bearing vessel being suitable for withstanding pressures of about 1035 kPa (150 psia) to about 7590 kPa (1100 psia) and temperatures of about −123° C. (−190° F.) to about −62° C. (−80° F.), said composite materials comprising fibers selected from the group consisting of (i) carbon, (ii) glass, (iii) kevlar®, (iv) aramid, and (v) Ultra-High Molecular Weight Polyethylene.

Also provided is a method of making a container suitable for storing a pressurized liquefied natural gas at a pressure of about 1035 kPa (150 psia) to about 7590 kPa (1100 psia) and at a temperature of about −123° C. (−190° F.) to about −62° C. (−80° F.), said method comprising the steps of: (a) constructing a self-supporting liner, said self-supporting liner being suitable for providing a substantially impermeable barrier to said pressurized liquefied natural gas; and (b) overwrapping said self-supporting liner with adequate composite materials to form a load-bearing vessel in contact with said self-supporting liner, said load-bearing vessel being suitable for withstanding pressures of about 1035 kPa (150 psia) to about 7590 kPa (1100 psia) and temperatures of about −123° C. (−190° F.) to about −62° C. (−80° F.), and said composite materials having a coefficient of thermal expansion that is substantially the same as the coefficient of thermal expansion of said self-supporting liner at the interface with said self-supporting liner.

In yet another embodiment of this invention, a method of storing a pressurized liquefied natural gas at a pressure of about 1035 kPa (150 psia) to about 7590 kPa (1100 psia) and at a temperature of about −123° C. (−190° F.) to about −62° C. (−80° F.) is provided, said method comprising the steps of containing said pressurized liquefied natural gas in at least one container, said at least one container comprising (a) a self-supporting liner, said self-supporting liner providing a substantially impermeable barrier to said pressurized liquefied natural gas; and (b) a load-bearing vessel in contact with said self-supporting liner, said load-bearing vessel having been made from composite materials and being suitable for withstanding pressures of about 1035 kPa (150 psia) to about 7590 kPa (1100 psia) and temperatures of about −123° C. (−190° F.) to about −62° C. (−80° F.), and said composite materials having a coefficient of thermal expansion that is substantially the same as the coefficient of thermal expansion of said self-supporting liner at the interface with said self-supporting liner. In another embodiment of said method, said at least one container comprises (a) a self-supporting liner, said self-supporting liner providing a substantially impermeable barrier to said pressurized fluid; and (b) a load-bearing vessel in contact with said self-supporting liner, said load-bearing vessel having been made from composite materials and being suitable for withstanding pressures of about 1035 kPa (150 psia) to about 7590 kPa (1100 psia) and temperatures of about −123° C. (−190° F.) to about −62° C. (−80° F.), and said composite materials having a coefficient of thermal expansion (i) that is substantially the same as the coefficient of thermal expansion of said self-supporting liner at the interface with said self-supporting liner, and (ii) that gradually decreases through the thickness of said load-bearing vessel as the distance from said interface increases. In another embodiment of said method, said at least one container comprises (a) a self-supporting liner, said self-supporting liner providing a substantially impermeable barrier to said pressurized fluid; and (b) a load-bearing vessel in contact with said self-supporting liner, said load-bearing vessel having been made from composite materials and being suitable for withstanding pressures of about 1035 kPa (150 psia) to about 7590 kPa (1100 psia) and temperatures of about −123° C. (−190° F.) to about −62° C. (−80° F.), and said composite materials comprising an intermediate material at the interface with said self-supporting liner, wherein said intermediate material has adequate shear strength or strain to substantially prevent failure of said container during changes in temperature between ambient and about −123° C. (−190° F.). In another embodiment of said method, said at least one container comprises (a) a self-supporting liner made of a material consisting essentially of aluminum and that provides a substantially impermeable barrier to said pressurized fluid; and (b) a load-bearing vessel in contact with said self-supporting liner, said load-bearing vessel having been made from composite materials and being suitable for withstanding pressures of about 1035 kPa (150 psia) to about 7590 kPa (1100 psia) and temperatures of about −123° C. (−190° F.) to about −62° C. (−80° F.), said composite materials comprising fibers selected from the group consisting of (i) carbon, (ii) glass, (iii) kevlar®, (iv) aramid, and (v) Ultra-High Molecular Weight Polyethylene. In another embodiment of said method, said at least one container comprises (a) a self-supporting liner made of a material consisting essentially of a steel having a yield strength of at least about 690 MPa (100 ksi) and a ductile to brittle transition temperature lower than about −62° C. (−80° F.) in the base material and in its heat-affected-zone after welding and that provides a substantially impermeable barrier to said pressurized fluid; and (b) a load-bearing vessel in contact with said self-supporting liner, said load-bearing vessel having been made from composite materials and being suitable for withstanding pressures of about 1035 kPa (150 psia) to about 7590 kPa (1100 psia) and temperatures of about −123° C. (−190° F.) to about −62° C. (−80° F.), said composite materials comprising fibers selected from the group consisting of (i) carbon, (ii) glass, (iii) kevlar®, (iv) aramid, and (v) Ultra-High Molecular Weight Polyethylene.

Unlike the conventional approach using a non-load bearing liner, the container design of this invention uses a self-supporting metallic liner overwrapped with high-performance composite fibers with a cryogenic resin. As used herein, the term "self-supporting" in regard to a liner means capable of maintaining its structural integrity while supporting its own weight. Once the overwrap is applied, the composite provides additional buckling resistance for the container. For example, referring to FIG. 6, which is a graph having an abscissa 60 representing liner thickness in millimeters and an ordinate 61 representing collapse pressure in pounds per square inch, line 62 shows the critical pressure line, line 63 shows the collapse pressure for a liner having a diameter of 10 meters (32.8 feet), line 64 shows the collapse pressure for a liner having a diameter of 20 meters (65.6 feet), and line 65 shows the collapse pressure for a liner having a diameter of 40 meters (131.2 feet). Other criteria, besides collapse pressure, may be used to determine whether a container liner is self-supporting, as is familiar to those skilled in the art. As used herein, the term "high-performance" in regard to composites or fibers means having a tensile strength greater than about 3401 MPa (500 ksi) and a modulus greater than about 136054 MPa (20 million pounds per square inch (msi)). One embodiment comprises a basic LNG spherical tank over-wrapped with a high-performance composite to provide the structural integrity requirements for PLNG containment. The advantages and characteristics of this invention are more clearly described in the following.

The liner itself provides the primary structural support for the forces imposed by the tension in the fibers as they are wound over the liner. Fibers that are wound over the liner contribute to the support. The liner may bear some of the loads exerted by the pressurized, cryogenic temperature fluids contained in the container. As is familiar to those skilled in the art, design details such as the thickness of the liner, or the percentage of load that the liner will bear, is determined by one skilled in the art based on the materials that comprise the liner and the composite overwrap and on other factors that are familiar to those skilled in the art.

Second, several innovative design approaches to address the CTE differences between the metallic liner and the composite are provided. In one embodiment, the differences in CTE are graduated by use of intermediate matrix-fiber materials that have a CTE substantially the same as the CTE of the liner at the interface with the liner, and have gradually decreasing CTE's as the distance from the liner increases. In one embodiment, the outermost overwrap layer consists essentially of carbon fibers for improved creep performance, or of a material that provides similar creep performance as carbon fibers would provide. The matrix-fiber material design comprises an intra-ply hybrid fiber mixture in which carbon and glass fibers are mixed within the ply (or tow). This has the added beneficial effect of attaining good compaction for the composite. A variation of this hybrid approach is inter-ply mixing whereby alternating layers of different fibers are used. A third variation involves differing resin fraction for the laminates: the laminates adjacent to the liner have a higher resin fraction than laminates further away from the liner, and the resin fraction in laminates extending further from the liner is gradually reduced as the distance from the liner increases. The resin can be specially formulated with customized CTE properties to enhance the performance of each layer of composite or laminate. In the case where an aluminum liner is used, this approach recognizes the relatively large difference in CTE between aluminum and carbon fiber, a preferred fiber for this design due to its better creep performance, and the relatively small difference in CTE between aluminum and glass fiber. As used herein, the term "creep" means time-dependent strain caused by stress.

In another embodiment, the self-supporting liner is designed to withstand the critical buckling loads for the application. Consequently, the interface between the metallic liner and the composite overwrap is left unbonded. This differs from conventional lined composite container designs in which the non-load bearing liner is bonded to the composite overwrap with an adhesive that can withstand the interface shear associated with the application; this is done to mitigate against liner failure by preventing liner separation from the composite overwrap.

In yet another embodiment, the outermost overwrap layer consists essentially of carbon fibers for improved creep performance, or a material that provides similar creep performance as carbon fibers would provide. An intermediate layer of predominantly glass fiber is placed between the outermost carbon fiber overwrap and liner made of aluminum capable of cryogenic service. The autofrettage process is used to provide a residual compressive pre-stress in the liner to a degree that offsets the differential thermal contraction of the system. Without the intermediate layer of glass fiber, the residual compressive pre-stress would be inadequate to offset the much higher differential contraction between the aluminum and the carbon. The following data for a spherical pressure vessel design using aluminum 5083-0, illustrates the point. An interface bearing pressure of 34 kPa (5 psi) in tension is developed at the girth between the aluminum and the carbon fiber composite when the pressure vessel is cooled to −95° C. (−140° F.). This results after an autofrettage pressure of 5.78 MPa (850 psig), followed by a proof pressure of 5.1 MPa (750 psig) both at room temperature. The corresponding bearing pressure after rebound from proof pressure is 340 kPa (50 psig) in compression. The glass ensures positive bearing pressure at the interface thereby preventing bondline fissuring. The low yield strength of aluminum limits the residual compressive pre-stress induced in the liner after the autofrettage process.

In another embodiment of this invention, the outermost overwrap layer consists essentially of carbon fibers for improved creep performance, or a material that provides similar creep performance as carbon fibers would provide. The liner uses a material of high yield strength thereby enabling a much higher residual compressive pre-stress to be induced. This higher pre-stress essentially offsets the differential contraction between the liner and the carbon, and essentially no intermediate material such as glass fiber or adhesive is required at the interface between the liner and the carbon composite. In addition to the high yield strength, the material must have adequate low temperature toughness. Preferably, such high yield strength material has a yield strength of at least about 690 MPa (100 ksi) and a Ductile to Brittle Transition Temperature ("DBTT") lower than about −62° C. (−80° F.) in the base material and in its heat-affected-zone ("HAZ") after welding, if any. Example materials that meet the yield strength and DBTT requirements are discussed in International Publication Nos. WO 99/32672, WO 00/39352, WO 99/32670, WO 00/40764, WO 99/32671, WO 00/37689, and WO 99/05335, and in U.S. Pat. Nos. 6,251,198, 6,254,698, 6,066,212, 6,159,312, and 6,264,760 (all of which U.S. patents are hereby incorporated herein by reference). Useful welding techniques for joining such steels are discussed in International Publication Nos. WO 01/63974, WO 99/05335, and WO 00/56498, and in U.S. Pat. Nos. 6,114,656 and 6,336,583 (both of which U.S. patents are hereby incorporated herein by reference). Other suitable steels and welding techniques may exist or be developed hereafter. All such steels and welding techniques are within the scope of the present invention. A non-limiting liner steel and welding example is provided at the end of the Detailed Description of the Invention.

The proposed design has several advantages over the conventional PLNG containment system based on steel including the following: (i) The fabrication process is simplified; (ii) The containment system weight is reduced which favorably impacts the transport ship design; (iii) The product piping requirements are tremendously simplified; (iv) The off-loading scheme is also simplified; and (v) The insulation requirement is reduced.

DESCRIPTION OF THE DRAWINGS

The advantages of the present invention will be better understood by referring to the following detailed description and the attached drawings in which:

FIG. 7A is a front, cross sectional view of an arrangement in a PLNG transportation vessel hull of horizontally-situated containers according to this invention having cylindrical geometries;

FIG. 7B is a side, cross sectional view of an arrangement in a PLNG transportation vessel hull of horizontally-situated containers according to this invention having cylindrical geometries;

FIG. 7C is a top, cross sectional view of an arrangement in a PLNG transportation vessel hull of horizontally-situated containers according to this invention having cylindrical geometries;

Figure 1:
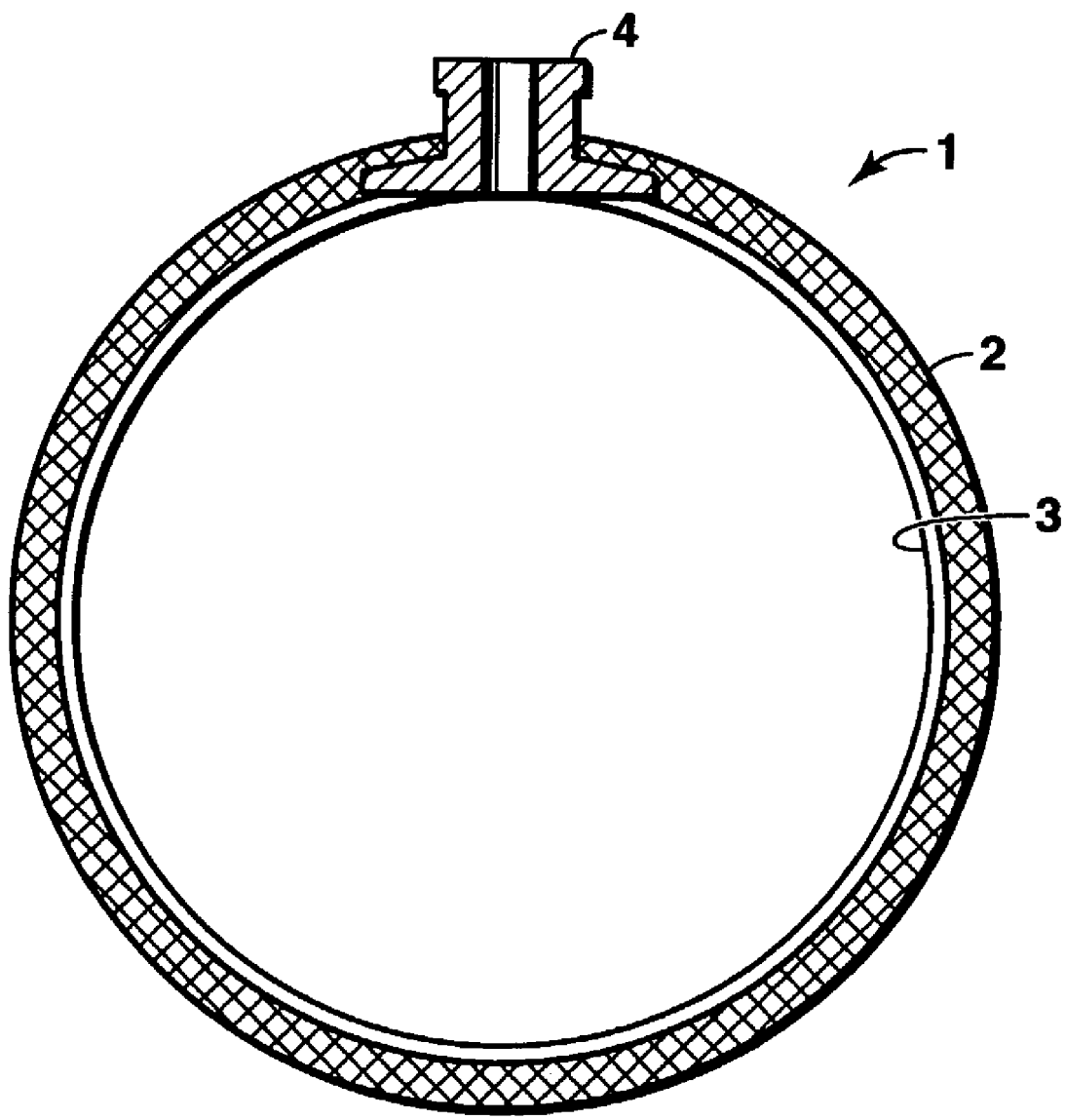
FIG. 1 is a cross section of a container according to this invention having a spherical geometry.

While the invention will be described in connection with its preferred embodiments, it will be understood that the invention is not limited thereto. On the contrary, the invention is intended to cover all alternatives, modifications, and equivalents which may be included within the spirit and scope of the present disclosure, as defined by the appended claims.

DETAILED DESCRIPTION OF THE INVENTION

Composite Overwrap

The composite overwrap in a container according to this invention preferably provides the primary structural support for the operating loads. The composite overwrap is preferably a material system comprising high-performance fibers in a resin matrix capable of cryogenic temperature service. As used herein "cryogenic temperature" means any temperature of about −62° C. (−80° F.) and colder. An example of such a resin is the CTD 525 epoxy cryogenic resin. Two classes of material systems have been designed for this invention.

The first class of material systems comprises: (i) a high performance fiber, preferably selected from the following fibers (carbon, glass, kevlar®, aramid, UHMWP); and (ii) a thermo-setting resin (such as the CTD-525 epoxy cryogenic resin). One embodiment uses high-performance carbon fiber such as TORAY T-700, GRAFIL 34-600 or ZOLTEK PANEX 35 for better creep performance. This first class of material system is characterized by a constant CTE value. For example, the average CTE value measured for carbon/epoxy resin laminate between room temperature and −73° C. (−100° F.) is $1.1\times10^{-7}$ m/m/K ($0.19\times10^{-6}$ in/in/° F.). This value typically results in a mismatch with several metallic liners and particularly with aluminum and the high yield strength steels discussed herein, i.e., steels having a yield strength of at least about 690 MPa (100 ksi).

The second class of material systems is characterized by tunable CTE values and comprises combinations of fibers (mixing different fibers such as glass and carbon) with various resin combinations. The resin combinations may comprise substantially pure resins as well as resins with additives designed to affect the CTE of the resin. By judicious optimization of parameters such as the ratio of fibers, resin fraction, and additive content, a preferred CTE value is obtained. Representative measured CTE values are, for example without hereby limiting this invention, $7.2\times10^{-6}$ m/m/K ($13\times10^{-6}$ in/in/° F.) for aluminum, $18.8\times10^{-6}$ m/m/K ($33.9\times10^{-6}$ in/in/° F.) for neat resin, and $1.1\times10^{-7}$ m/m/K ($0.19\times10^{-6}$ in/in/° F.) for carbon. The optimization process required is familiar to those skilled in the art based on the desired performance parameters of the container being constructed. Further, different laminates of the overwrap are tuned to different CTE values resulting in a gradation of CTE from the liner interface to the exterior surface of the overwrap. This gradation is designed to achieve acceptable inter-laminate stress. This acceptable value can be determined from analytical techniques such as a detailed finite element analysis (FEA analysis), as is familiar to those skilled in the art.

The use of the second class of materials enables use of liner materials with any CTE characteristic. Conversely, the fixed CTE value characteristic of the first class of materials constrains its use to liners of closely matching CTE such as liners made of INVAR. The average CTE value for INVAR is of the same order of magnitude as carbon $5.0\times10^{-7}$ m/m/K compared to $1.1\times10^{-7}$ m/m/K ($0.9\times10^{-6}$ in/in/° F. compared to $0.19\times10^{-6}$ in/in/° F.). Another aspect of this invention is the use of an intermediate material, with high-strain capability, i.e., a strain energy absorption capability greater than about 34 Joules per square meter ($3.0\times10^{-3}$ Btu per square foot), at the interface between the liner and the material system of the first class.

Metallic Liner

The metallic liner of a container according to this invention preferably serves three primary functions: (i) It provides an impermeable barrier for the fluid contained; (ii) It provides the primary structural support required during the winding process due to tension in the fibers; and (iii) It provides at least partial structural support for the operating load. Further, the liner provides at least partial structural support for the operating loads imposed by the internal pressure due to the PLNG as well as external loads such as due to ship motions.

Figure 5:
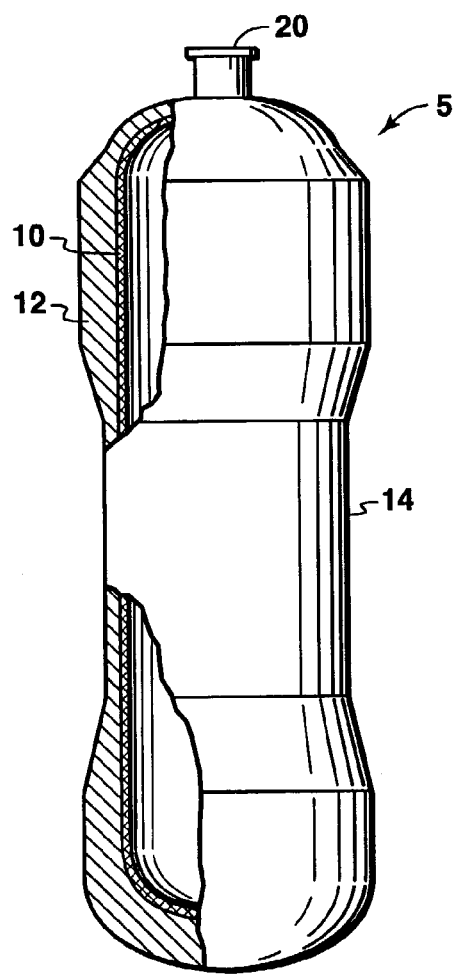
FIG. 5 illustrates with cut-away views, one embodiment of a container according to this invention having a cylindrical geometry and geodesic-isotensoid half domes.
Figure 6:
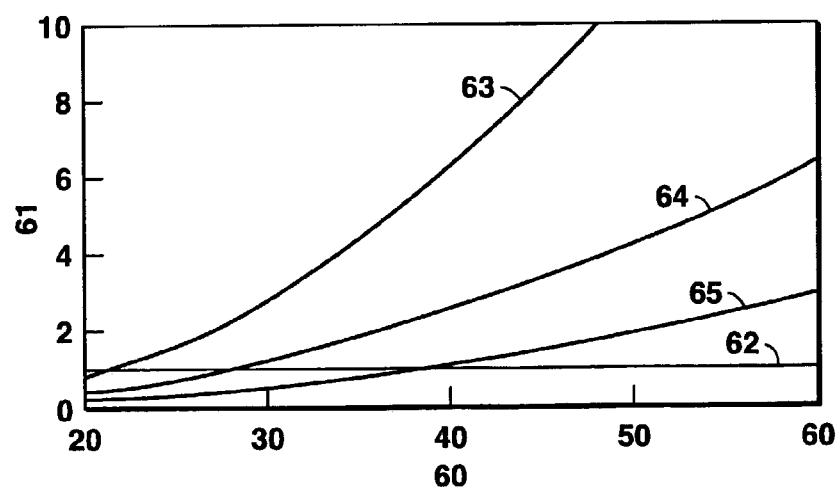
FIG. 6 is a graph showing the relation between container liner collapse pressure, container liner thickness, and container liner diameter.

Referring to FIG. 5, one embodiment of a container 5 according to this invention comprises a composite vessel 12 and a liner 10 made of a substantially impermeable material such as aluminum or the high yield strength steels discussed herein, i.e., steels having a yield strength of at least about 690 MPa (100 ksi), which provides a barrier for PLNG contained in container 5. In this embodiment, composite vessel 12 bears the structural load, including the internal pressure load, of container 5. Liner 10 is completely surrounded by composite vessel 12, and is therefore a fully-wrapped pressure vessel. A hoop-wrapped alternative may be designed in which case the liner 10 is sized to take the full load in the half dome sections. Container 5 is preferably protected by an outer-coating 14 made of a material capable of protecting composite vessel 12 from moisture, acids, ultra-violet rays and other environmental hazards as necessary. For example, without limiting this invention, outer-coating 14 could be made from polyurethane. Container 5 may also include provision for a support system. For example, a reinforcement boss (not shown in FIG. 5) may be provided at the lower end of container 5 for interfacing with a support skirt (not shown in FIG. 5). The design of the support skirt may be of any typical design, as will be familiar to those skilled in the art. Preferably, any added reinforcement boss is integrally wound with composite vessel 12. This provides for significant economic benefit and also for improved structural strength and integrity of the interface between a support system and container 5. A nozzle 20 is provided, preferably at an upper end of container 5, to allow for penetrations into container 5, e.g. for the loading or unloading of PLNG. In one embodiment, nozzle 20 is derived from a metallic boss (not shown in FIG. 5) installed prior to winding the composite that makes up composite vessel 12. The metallic boss is over-wrapped with the composite providing a leak-tight and high-strength interface for access into container 5.

In an alternative embodiment, a horizontal orientation for containers according to this invention on a marine transportation vessel 90 maximizes the cargo volume and results in a finer hull in transportation vessel 90, as illustrated in FIG. 7A–FIG. 7C. Referring now to FIG. 7B, the lengths of horizontally oriented containers 92 are preferably defined such that each container 92 can be supported at two points, e.g., points 93 and 94. In view of the complex motion of a PLNG transportation vessel 90, a simple two-point support system is preferred for horizontally oriented containers 92, as will be familiar to those skilled in the art. As will also be familiar to those skilled in the art, the two-point support system imposes limitations on the lengths of containers 92. When a project requires greater storage capacity than is provided by containers of the lengths allowed by a two-point support system, a moderate increase in support system complexity enables the use of containers of longer lengths.

Figure 2B:
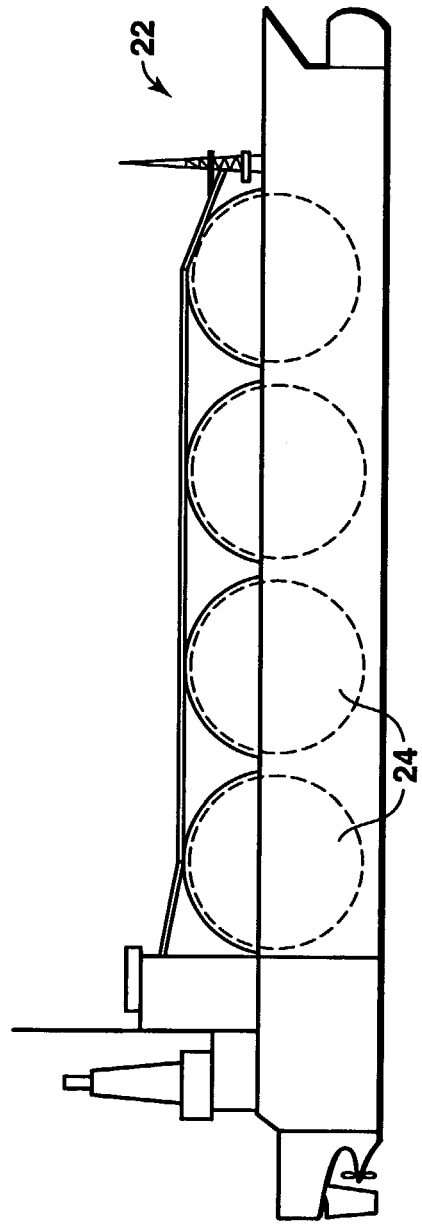
FIG. 2B is a side, cross sectional view of an arrangement in a PLNG transportation vessel hull of several containers according to this invention having spherical geometries.
Figure 2C:
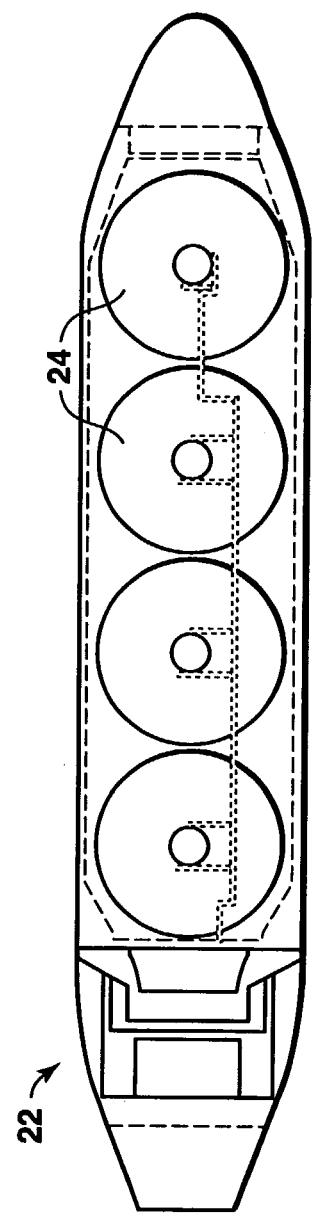
FIG. 2C is a top, cross sectional view of an arrangement in a PLNG transportation vessel hull of several containers according to this invention having spherical geometries.
Figure 2A:
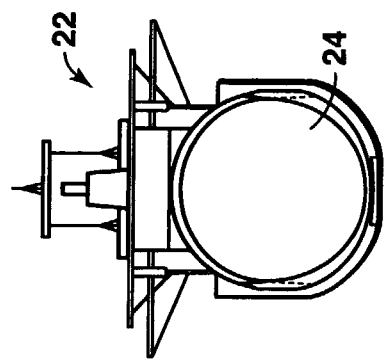
FIG. 2A is a front, cross sectional view of a container according to this invention having a spherical geometry and located in a PLNG transportation vessel hull.

As illustrated in FIG. 1, a container 1 according to this invention comprising a self-supporting liner 3 and a composite-overwrap 2 can have a spherical shape. Container 1 can include a nozzle 4 to allow for penetrations into container 1. Referring now to FIG. 2A–FIG. 2C, for an embodiment of four spherical containers 24 according to this invention onboard a ship 22 and carrying about 200,000 cubic meters of PLNG product, the following geometric parameters for the liner (e.g., self-supporting liner 3 as illustrated in FIG. 1) have been found to meet the ship and cargo requirements as well as the above-stated functional requirements of the liner:

Diameter—about 46 meters (150.9 feet)
Liner material—Aluminum alloy 5083-0
Yield Strength—about 190 MPa (28000 psi)
Average thickness—about 45 mm (1.77 inch)
Unit Thermal Contraction (UTC) at 27° C. to −95° C. (80° F. to −140° F.)—about 0.256% or 2.56 mm/m ($2.56 \times 10^{-3}$ in/in)

The choice of aluminum in this embodiment results in a substantial mismatch of the coefficient of thermal expansion with a carbon overwrap (UTC<0.02%). Therefore the preferred composite material system is chosen from the set in which different laminates of the overwrap are tuned to different CTE values resulting in a gradation of CTE from the liner interface to the exterior surface of the overwrap Referring again to FIG. 2A–FIG. 2C, for an alternative embodiment of this invention for the four spherical containers 24 on a ship 22 carrying about 200,000 cubic meters (7062891 cubic feet) of product, the following geometric parameters for the liner have been found to meet the ship and cargo requirements as well as the above-stated functional requirements of the liner:

Diameter—about 46 meters (150.9 feet)
Liner material—INVAR-36 (alloy of iron with 36% nickel)
Yield Strength—about 236.7 MPa (34.8 ksi)
Ultimate strength—about 432.7 MPa (63.6 ksi)
Average thickness—about 35 mm (1.38 inch)
Unit Thermal Contraction (UTC) at about 27° C. to about −162° C. (80° F. to about −260° F.)—about 0.03% or 0.3 mm/m ($3.0 \times 10^{-4}$ in/in)

This alternative embodiment is designed for minimal CTE mismatch with the basic material system, such as carbon-fiber-epoxy system as defined above.

In another such alternative embodiment, the following geometric parameters for the liner have been found to meet the ship and cargo requirements as well as the above-stated functional requirements of the liner:

Diameter—about 46 meters (150.9 feet)
Liner material—a high yield strength steel as discussed herein
Yield Strength—about 120000 psi (816 MPa)
Average thickness—about 25.4 mm (1 inch)
Unit Thermal Contraction (UTC) at 27° C. to −95° C. (80° F. to −140° F.)—about 0.128% or 1.28 mm/m ($1.28 \times 10^{-3}$ in/in)

This alternative embodiment allows a higher residual compressive pre-stress in the liner to offset the difference in thermal contraction between the liner and the carbon overwrap.

Figure 3:
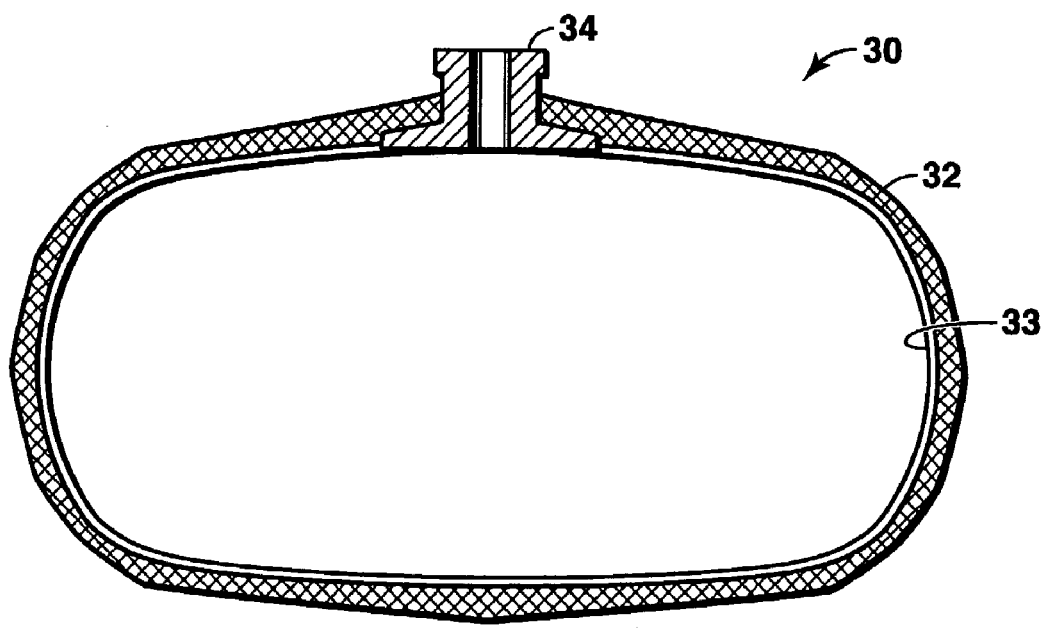
FIG. 3 is a cross section of a container according to this invention having an oblate spheroidal geometry.
Figure 4:
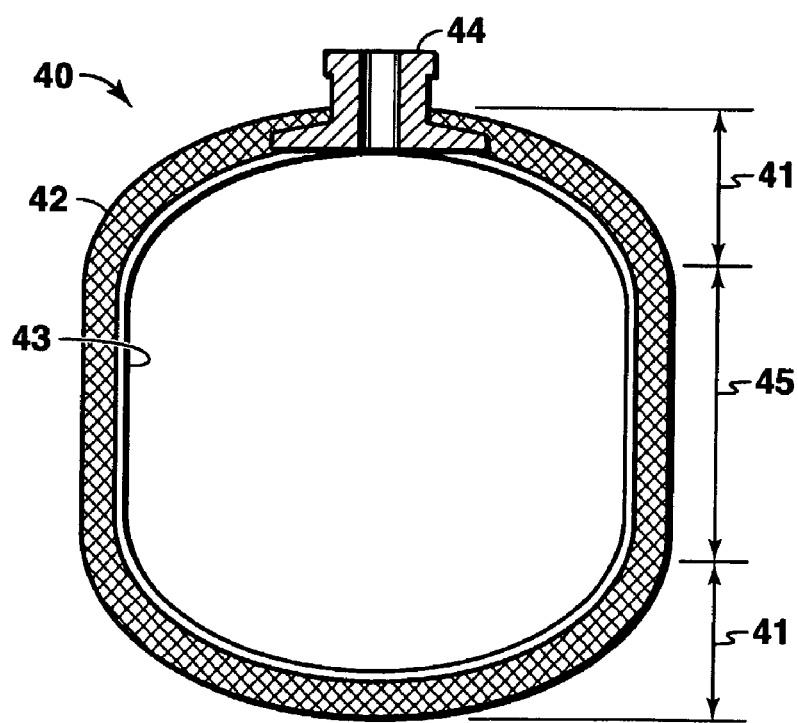
FIG. 4 is a cross section of a container according to this invention having geodesic-isotensoid half domes attached to a relatively short cylindrical section.

An alternative geometry, over the spherical geometry, for this embodiment is a cylinder with geodesic-isotensoid half domes. A geodesic-isotensoid contour is a dome contour in which the filaments are placed on geodesic paths so that the filaments will exhibit uniform tensions throughout their length under pressure loading. The geodesic path is the shortest distance between two points on a surface. Consequently, this geometry results in reduced fiber requirement (about 30% less) relative to the spherical configuration. Further the geodesic-isotensoid domed cylinder is a more efficient shape for space utilization than a sphere. Referring now to FIG. 4, a container 40 having geodesic-isotensoid half domes 41 attached to a relatively short cylindrical section 45 comprises a self-supporting liner 43 and a composite overwrap 42. Container 40 may have a nozzle 44. Referring now to FIG. 3, a container 30 having an oblate spheroidal geometry comprises a self-supporting liner 33 and a composite overwrap 32. Container 30 may have a nozzle 34.

Benefits of the composite containment system of this invention for PLNG include the following. Ship design can be optimized for the geometry and large dimensions of the PLNG containers. The composite containment system of this invention can be fabricated for the uniquely large dimensions required for PLNG transportation, i.e., by providing a self-supporting structure for a filament-winding fabrication process. Also, the system performs structurally at cryogenic conditions because differences in CTE between the liner and the composite overwrap material are adequately matched.

Liner Steel and Welding Example

As described in U.S. Pat. No. 6,066,212 (and in corresponding International Publication No. WO 99/32671), a method is provided for preparing an ultra-high strength, dual phase steel plate having a microstructure comprising about 10 vol % to about 40 vol % of a first phase of substantially 100 vol % (i.e., substantially pure or "essentially") ferrite and about 60 vol % to about 90 vol % of a second phase of predominantly fine-grained lath martensite, fine-grained lower bainite, or mixtures thereof, wherein the method comprises the steps of (a) heating a steel slab to a reheating temperature sufficiently high to (i) substantially homogenize the steel slab, (ii) dissolve substantially all carbides and carbonitrides of niobium and vanadium in the steel slab, and (iii) establish fine initial austenite grains in the steel slab; (b) reducing the steel slab to form steel plate in one or more hot rolling passes in a first temperature range in which austenite recrystallizes; (c) further reducing the steel plate in one or more hot rolling passes in a second temperature range below about the $T_{nr}$ temperature and above about the $Ar_3$ transformation temperature; (d) further reducing said steel plate in one or more hot rolling passes in a third temperature range below about the $Ar_3$ transformation temperature and above about the $Ar_1$ transformation temperature (i.e., the intercritical temperature range); (e) quenching said steel plate at a cooling rate of about 10° C. per second to about 40° C. per second (18° F./sec–72° F./sec) to a Quench Stop Temperature (QST) preferably below about the $M_s$ transformation temperature plus 200° C. (360° F.); and (f) stopping said quenching. In another embodiment of this steel example, the QST is preferably below about the Ms transformation temperature plus 100° C. (180° F.), and is more preferably below about 350° C. (662° F.). In one embodiment of this steel example, the steel plate is allowed to air cool to ambient temperature after step (f). This processing facilitates transformation of the microstructure of the steel plate to about 10 vol % to about 40 vol % of a first phase of ferrite and about 60 vol % to about 90 vol % of a second phase of predominantly fine-grained lath martensite, fine-grained lower bainite, or mixtures thereof. (See Glossary for definitions of $T_{nr}$ temperature, and of $Ar_3$, $Ar_1$, and $M_s$ transformation temperatures.)

To ensure ambient and cryogenic temperature toughness, the microstructure of the second phase in steels of this steel example comprises predominantly fine-grained lower bainite, fine-grained lath martensite, or mixtures thereof. It is preferable to substantially minimize the formation of embrittling constituents such as upper bainite, twinned martensite and MA in the second phase. As used in this steel example, and in the claims, "predominantly" means at least about 50 volume percent. The remainder of the second phase microstructure can comprise additional fine-grained lower bainite, additional fine-grained lath martensite, or ferrite. More preferably, the microstructure of the second phase comprises at least about 60 volume percent to about 80 volume percent fine-grained lower bainite, fine-grained lath martensite, or mixtures thereof. Even more preferably, the microstructure of the second phase comprises at least about 90 volume percent fine-grained lower bainite, fine-grained lath martensite, or mixtures thereof.

To make a steel according to this example, a steel slab is manufactured in a customary fashion and comprises iron and the following alloying elements, preferably in the weight percentage ranges indicated in the following: 0.04–0.12 carbon (C), more preferably 0.04–0.07 C; 0.5–2.5 manganese (Mn), more preferably 1.0–1.8 Mn; 1.0–3.0 nickel (Ni), more preferably 1.5–2.5 N; 0.02–0.1 niobium (Nb), more preferably 0.02–0.05 Nb; 0.008–0.03 titanium (Ti), more preferably 0.01–0.02 Ti; 0.001–0.05 aluminum (Al), more preferably 0.005–0.03 Al; and 0.002–0.005 nitrogen (N), more preferably 0.002–0.003 N. Chromium (Cr) is sometimes added to the steel, preferably up to about 1.0 wt %, and more preferably about 0.2 wt % to about 0.6 wt %. Molybdenum (Mo) is sometimes added to the steel, preferably up to about 0.8 wt %, and more preferably about 0.1 wt % to about 0.3 wt %. Silicon (Si) is sometimes added to the steel, preferably up to about 0.5 wt %, more preferably about 0.01 wt % to about 0.5 wt %, and even more preferably about 0.05 wt % to about 0.1 wt %. Copper (Cu), preferably in the range of about 0.1 wt % to about 1.0 wt %, more preferably in the range of about 0.2 wt % to about 0.4 wt %, is sometimes added to the steel. Boron (B) is sometimes added to the steel, preferably up to about 0.0020 wt %, and more preferably about 0.0006 wt % to about 0.0010 wt %. The steel preferably contains at least about 1 wt % nickel. Nickel content of the steel can be increased above about 3 wt % if desired to enhance performance after welding. Each 1 wt % addition of nickel is expected to lower the DBTT of the steel by about 10° C. (18° F.). Nickel content is preferably less than 9 wt %, more preferably less than about 6 wt %. Nickel content is preferably minimized in order to minimize cost of the steel. If nickel content is increased above about 3 wt %, manganese content can be decreased below about 0.5 wt % down to 0.0 wt %. Therefore, in a broad sense, up to about 2.5 wt % manganese is preferred.

Additionally, residuals are preferably substantially minimized in the steel. Phosphorous (P) content is preferably less than about 0.01 wt %. Sulfur (S) content is preferably less than about 0.004 wt %. Oxygen (O) content is preferably less than about 0.002 wt %.

In somewhat greater detail, a steel according to this steel example is prepared by forming a slab of the desired composition; heating the slab to a temperature of from about 955° C. to about 1065° C. (1750° F.–1950° F.); hot rolling the slab to form steel plate in one or more passes providing about 30 percent to about 70 percent reduction in a first temperature range in which austenite recrystallizes, i.e., above about the $T_{nr}$ temperature, further hot rolling the steel plate in one or more passes providing about 40 percent to about 80 percent reduction in a second temperature range below about the $T_{nr}$ temperature and above about the $Ar_3$ transformation temperature, and finish rolling the steel plate in one or more passes to provide about 15 percent to about 50 percent reduction in the intercritical temperature range below about the $Ar_3$ transformation temperature and above about the $Ar_1$ transformation temperature. The hot rolled steel plate is then quenched at a cooling rate of about 10° C. per second to about 40° C. per second (18° F./sec–72° F./sec) to a suitable Quench Stop Temperature (QST) preferably below about the $M_s$ transformation temperature plus 200° C. (360° F.), at which time the quenching is terminated. In another embodiment of this example, the QST is preferably below about the $M_s$ transformation temperature plus 100° C. (180° F.), and is more preferably below about 350° C. (662° F.). In one embodiment of this steel example, the steel plate is allowed to air cool to ambient temperature after quenching is terminated.

As is understood by those skilled in the art, as used herein "percent reduction in thickness" refers to percent reduction in the thickness of the steel slab or plate prior to the reduction referenced. For purposes of explanation only, without thereby limiting this example, a steel slab of about 25.4 cm (10 inches) thickness may be reduced about 50% (a 50 percent reduction), in a first temperature range, to a thickness of about 12.7 cm (5 inches) then reduced about 80% (an 80 percent reduction), in a second temperature range, to a thickness of about 2.5 cm (1 inch). Again, for purposes of explanation only, without thereby limiting this example, a steel slab of about 25.4 cm (10 inches) may be reduced about 30% (a 30 percent reduction), in a first temperature range, to a thickness of about 17.8 cm (7 inches) then reduced about 80% (an 80 percent reduction), in a second temperature range, to a thickness of about 3.6 cm (1.4 inch), and then reduced about 30% (a 30 percent reduction), in a third temperature range, to a thickness of about 2.5 cm (1 inch). As used herein, "slab" means a piece of steel having any dimensions.

For this example steel, as is understood by those skilled in the art, the steel slab is preferably reheated by a suitable means for raising the temperature of substantially the entire slab, preferably the entire slab, to the desired reheating temperature, e.g., by placing the slab in a furnace for a period of time. The specific reheating temperature that should be used may be readily determined by a person skilled in the art, either by experiment or by calculation using suitable models. Additionally, the furnace temperature and reheating time necessary to raise the temperature of substantially the entire slab, preferably the entire slab, to the desired reheating temperature may be readily determined by a person skilled in the art by reference to standard industry publications.

For this example steel, as is understood by those skilled in the art, the temperature that defines the boundary between the recrystallization range and non-recrystallization range, the $T_{nr}$ temperature, depends on the chemistry of the steel, and more particularly, on the reheating temperature before rolling, the carbon concentration, the niobium concentration and the amount of reduction given in the rolling passes. Persons skilled in the art may determine this temperature for each steel composition either by experiment or by model calculation. Likewise, the $Ar_1$, $Ar_3$, and $M_s$ transformation temperatures referenced herein may be determined by persons skilled in the art either by experiment or by model calculation.

For this steel example, as is understood by those skilled in the art, except for the reheating temperature, which applies to substantially the entire slab, subsequent temperatures referenced in describing the processing methods of this example are temperatures measured at the surface of the steel. The surface temperature of steel can be measured by use of an optical pyrometer, for example, or by any other device suitable for measuring the surface temperature of steel. The cooling rates referred to herein are those at the center, or substantially at the center, of the plate thickness; and the Quench Stop Temperature (QST) is the highest, or substantially the highest, temperature reached at the surface of the plate, after quenching is stopped, because of heat transmitted from the mid-thickness of the plate. For example, during processing of experimental heats of a steel composition according to the examples provided herein, a thermocouple is placed at the center, or substantially at the center, of the steel plate thickness for center temperature measurement, while the surface temperature is measured by use of an optical pyrometer. A correlation between center temperature and surface temperature is developed for use during subsequent processing of the same, or substantially the same, steel composition, such that center temperature may be determined via direct measurement of surface temperature. Also, the required temperature and flow rate of the quenching fluid to accomplish the desired accelerated cooling rate may be determined by one skilled in the art by reference to standard industry publications.

A person of skill in the art has the requisite knowledge and skill to use the information provided herein to produce ultra-high strength, low alloy steel plates having suitable high strength and toughness for use in constructing liners in accordance with the present invention.

A person of skill in the art has the requisite knowledge and skill to use the information provided herein to produce ultra-high strength, low alloy steel plates having modified thicknesses, compared to the thicknesses of the steel plates produced according to the examples provided herein, while still producing steel plates having suitable high strength and suitable cryogenic temperature toughness for use in the liners of the present invention. Other suitable steels may exist or be developed hereafter. All such steels are within the scope of the present invention.

When a dual phase steel is used in the construction of composite-overwrapped container liners according to this invention, the dual phase steel is preferably processed in such a manner that the time period during which the steel is maintained in the intercritical temperature range for the purpose of creating the dual phase structure occurs before the accelerated cooling or quenching step. Preferably the processing is such that the dual phase structure is formed during cooling of the steel between the $Ar_3$ transformation temperature to about the $Ar_1$ transformation temperature. An additional preference for steels used in the construction of liners according to this invention is that the steel has a yield strength greater than 690 MPa (100 ksi) and a DBTT lower than about −73° C. (−100° F.) upon completion of the accelerated cooling or quenching step, i.e., without any additional processing that requires reheating of the steel such as tempering. More preferably the yield strength of the steel upon completion of the quenching or cooling step is greater than about 690 MPa (100 ksi).

In order to join a steel to construct a liner according to the present invention, a suitable method of joining the steel plates is required. Any joining method that will provide joints with adequate strength and toughness for the present invention, is considered to be suitable. Preferably, a welding method suitable for providing adequate strength and fracture toughness to contain the fluid being contained or transported is used to construct the liners of the present invention. Such a welding method preferably includes a suitable consumable wire, a suitable consumable gas, a suitable welding process, and a suitable welding procedure. For example, both gas metal arc welding (GMAW) and tungsten inert gas (TIG) welding, which are both well known in the steel fabrication industry, can be used to join the steel plates, provided that a suitable consumable wire-gas combination is used.

In a first example welding method, the gas metal arc welding (GMAW) process is used to produce a weld metal chemistry comprising iron and about 0.07 wt % carbon, about 2.05 wt % manganese, about 0.32 wt % silicon, about 2.20 wt % nickel, about 0.45 wt % chromium, about 0.56 wt % molybdenum, less than about 110 ppm phosphorous, and less than about 50 ppm sulfur. The weld is made on a steel, such as any of the above-described steels, using an argon-based shielding gas with less than about 1 wt % oxygen. The welding heat input is in the range of about 0.3 kJ/mm to about 1.5 kJ/mm (7.6 kJ/inch to 38 kJ/inch). Welding by this method provides a weldment (see Glossary) having a tensile strength greater than about 900 MPa (130 ksi), preferably greater than about 930 MPa (135 ksi), more preferably greater than about 965 MPa (140 ksi), and even more preferably at least about 1000 MPa (145 ksi). Further, welding by this method provides a weld metal with a DBTT below about −73° C. (−100° F.), preferably below about −96° C. (−140° F.), more preferably below about −106° C. (−160° F.), and even more preferably below about −115° C. (−175° F.).

In another example welding method, the GMAW process is used to produce a weld metal chemistry comprising iron and about 0.10 wt % carbon (preferably less than about 0.10 wt % carbon, more preferably from about 0.07 to about 0.08 wt % carbon), about 1.60 wt % manganese, about 0.25 wt % silicon, about 1.87 wt % nickel, about 0.87 wt % chromium, about 0.51 wt % molybdenum, less than about 75 ppm phosphorous, and less than about 100 ppm sulfur. The welding heat input is in the range of about 0.3 kJ/mm to about 1.5 kJ/mm (7.6 kJ/inch to 38 kJ/inch) and a preheat of about 100° C. (212° F.) is used. The weld is made on a steel, such as any of the above-described steels, using an argon-based shielding gas with less than about 1 wt % oxygen. Welding by this method provides a weldment having a tensile strength greater than about 900 MPa (130 ksi), preferably greater than about 930 MPa (135 ksi), more preferably greater than about 965 MPa (140 ksi), and even more preferably at least about 1000 MPa (145 ksi). Further, welding by this method provides a weld metal with a DBTT below about −73° C. (−100° F.), preferably below about −96° C. (−140° F.), more preferably below about −106° C. (−160° F.), and even more preferably below about −115° C. (−175° F.).

In another example welding method, the tungsten inert gas welding (TIG) process is used to produce a weld metal chemistry containing iron and about 0.07 wt % carbon (preferably less than about 0.07 wt % carbon), about 1.80 wt % manganese, about 0.20 wt % silicon, about 4.00 wt % nickel, about 0.5 wt % chromium, about 0.40 wt % molybdenum, about 0.02 wt % copper, about 0.02 wt % aluminum, about 0.010 wt % titanium, about 0.015 wt % zirconium (Zr), less than about 50 ppm phosphorous, and less than about 30 ppm sulfur. The welding heat input is in the range of about 0.3 kJ/mm to about 1.5 kJ/mm (7.6 kJ/inch to 38 kJ/inch) and a preheat of about 100° C. (212° F.) is used. The weld is made on a steel, such as any of the above-described steels, using an argon-based shielding gas with less than about 1 wt % oxygen. Welding by this method provides a weldment having a tensile strength greater than about 900 MPa (130 ksi), preferably greater than about 930 MPa (135 ksi), more preferably greater than about 965 MPa (140 ksi), and even more preferably at least about 1000 MPa (145 ksi). Further, welding by this method provides a weld metal with a DBTT below about −73° C. (−100° F.), preferably below about −96° C. (−140° F.), more preferably below about −106° C. (−160° F.), and even more preferably below about −115° C. (−175° F.).

Similar weld metal chemistries to those mentioned in the examples can be made using either the GMAW or the TIG welding processes. However, the TIG welds are anticipated to have lower impurity content and a more highly refined microstructure than the GMAW welds, and thus improved low temperature toughness.

A person of skill in the art has the requisite knowledge and skill to use the information provided herein to weld ultra-high strength, low alloy steel plates to produce joints having suitable high strength and fracture toughness for use in constructing the liners of the present invention. Other suitable joining or welding methods may exist or be developed hereafter. All such joining or welding methods are within the scope of the present invention.

As will be familiar to those skilled in the art, the operating conditions taken into consideration in the design of composite-overwrapped container liners constructed from a welded steel for storing and transporting pressurized, cryogenic fluids, such as PLNG, include among other things, the operating pressure and temperature, as well as additional stresses that are likely to be imposed on the steel and the weldments (see Glossary). Standard fracture mechanics measurements, such as (i) critical stress intensity factor ($K_{IC}$), which is a measurement of plane-strain fracture toughness, and (ii) crack tip opening displacement (CTOD), which can be used to measure elastic-plastic fracture toughness, both of which are familiar to those skilled in the art, may be used to determine the fracture toughness of the steel and the weldments. Industry codes generally acceptable for steel structure design, for example, as presented in the BSI publication "Guidance on methods for assessing the acceptability of flaws in fusion welded structures", often referred to as "PD 6493: 1991", may be used to determine the maximum allowable flaw sizes for the liner based on the fracture toughness of the steel and weldment (including HAZ) and the imposed stresses on the liner. A person skilled in the art can develop a fracture control program to mitigate fracture initiation through (i) appropriate liner design to minimize imposed stresses, (ii) appropriate manufacturing quality control to minimize defects, (iii) appropriate control of life cycle loads and pressures applied to the liner, and (iv) an appropriate inspection program to reliably detect flaws and defects in the liner. A preferred design philosophy for the system of the present invention is "leak before failure", as is familiar to those skilled in the art. These considerations are generally referred to herein as "known principles of fracture mechanics."

The following is a non-limiting example of application of these known principles of fracture mechanics in a procedure for calculating critical flaw depth for a given flaw length for use in a fracture control plan to prevent fracture initiation in a liner according to this invention.

Figure 8A:
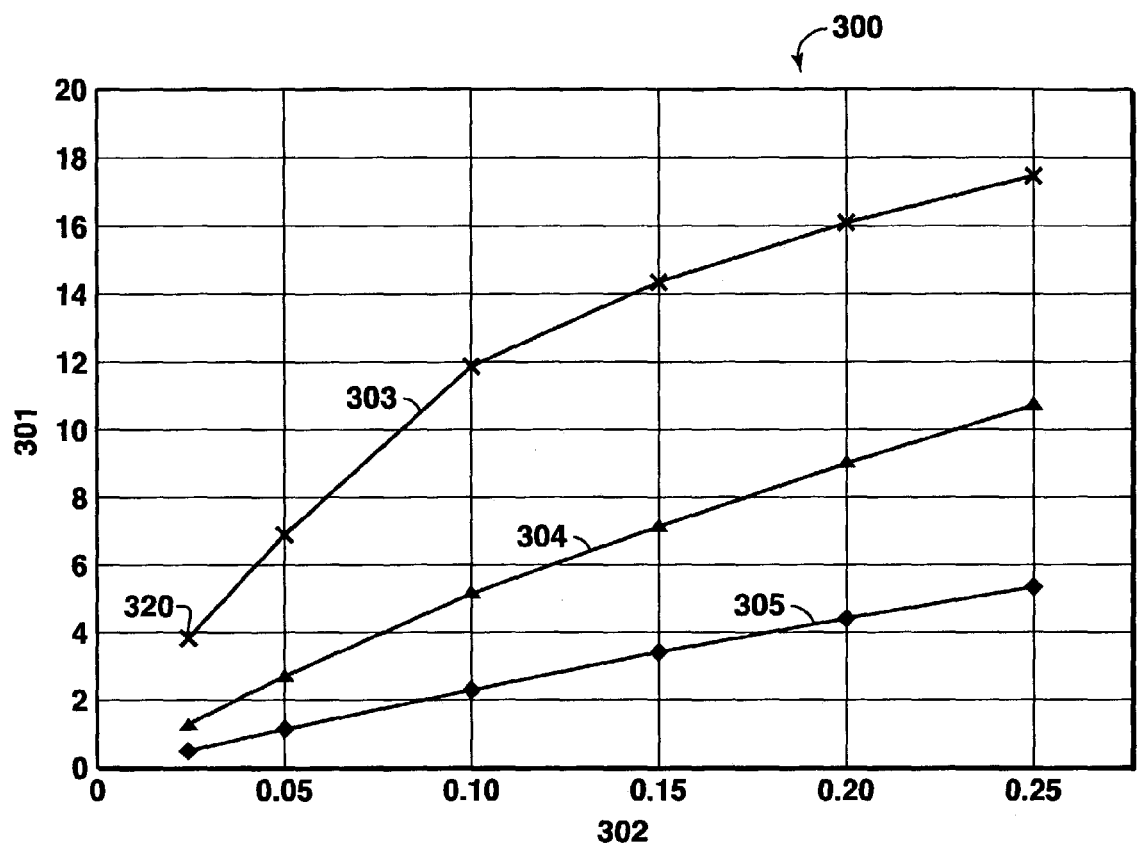
FIG. 8A illustrates a plot of critical flaw depth for a given flaw length, as a function of CTOD fracture toughness and of residual stress.
Figure 8B:
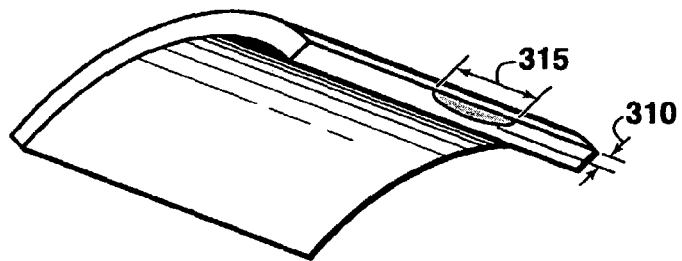
FIG. 8B illustrates the geometry (length and depth) of a flaw.

FIG. 8B illustrates a flaw of flaw length 315 and flaw depth 310. PD6493 is used to calculate values for the critical flaw size plot 300 shown in FIG. 8A (having abscissa 302 representing CTOD fracture toughness in mm and ordinate 301 representing critical flaw depth in mm) based on the following design conditions for a pressure vessel or liner according to this invention:

Vessel Diameter: 4.57 m (15 ft)
Vessel Wall Thickness: 25.4 mm (1.00 in.)
Design Pressure: 3445 kPa (500 psi)
Allowable Hoop Stress: 333 MPa (48.3 ksi).

For the purpose of this example, a surface flaw length of 100 mm (4 inches), e.g., an axial flaw located in a seam weld, is assumed. Referring now to FIG. 8A, plot 300 shows the value for critical flaw depth as a function of CTOD fracture toughness and of residual stress, for residual stress levels of 15 percent of yield stress (line 303), 50 percent of yield stress (line 304), and 100 percent of yield stress (line 305). Residual stresses can be generated due to fabrication and welding; and PD6493 recommends the use of a residual stress value of 100 percent of yield stress in welds (including the weld HAZ) unless the welds are stress relieved using techniques such as post weld heat treatment (PWHT) or mechanical stress relief.

Based on the CTOD fracture toughness of the steel at the minimum service temperature, the liner fabrication can be adjusted to reduce the residual stresses and an inspection program can be implemented (for both initial inspection and in-service inspection) to detect and measure flaws for comparison against critical flaw size. In this example, if the steel has a CTOD toughness of 0.025 mm at the minimum service temperature (as measured using laboratory specimens) and the residual stresses are reduced to 15 percent of the steel yield strength, then the value for critical flaw depth is approximately 4 mm (see point 320 on FIG. 8A). Following similar calculation procedures, as are well known to those skilled in the art, critical flaw depths can be determined for various flaw lengths as well as various flaw geometries. Using this information, a quality control program and inspection program (techniques, detectable flaw dimensions, frequency) can be developed to ensure that flaws are detected and remedied prior to reaching the critical flaw depth or prior to the application of the design loads. Based on published empirical correlations between CVN, $K_{IC}$ and CTOD fracture toughness, the 0.025 mm CTOD toughness generally correlates to a CVN value of about 37 J. This example is not intended to limit this invention in any way.

For liners that require bending of the steel, e.g., into a cylindrical shape, the steel is preferably bent into the desired shape at ambient temperature in order to avoid detrimentally affecting the excellent cryogenic temperature toughness of the steel. If the steel must be heated to achieve the desired shape after bending, the steel is preferably heated to a temperature no higher than about 600° C. (1112° F.) in order to preserve the beneficial effects of the steel microstructure as described above.

Although this invention is well suited for storage and transport of PLNG, it is not limited thereto; rather, this invention is suitable for storage and transport of any fluid, including cryogenic fluids, pressurized fluids, and cryogenic, pressurized fluids. Additionally, while the present invention has been described in terms of one or more preferred embodiments, it is to be understood that other modifications may be made without departing from the scope of the invention, which is set forth in the claims below.

GLOSSARY OF TERMS $Ar_1$ transformation temperature: the temperature at which transformation of austenite to ferrite or to ferrite plus cementite is completed during cooling;

$Ar_3$ transformation temperature: the temperature at which austenite begins to transform to ferrite during cooling;

CNG: compressed natural gas;

coefficient of thermal expansion or contraction: the increment in volume of a unit volume of a solid for a rise of temperature of 1° at constant pressure;

creep: time-dependent strain caused by stress;

cryogenic temperature: any temperature of about −62° C. (−80° F.) and colder;

CTE: coefficient of thermal expansion or contraction;

DBTT (Ductile to Brittle Transition Temperature): delineates the two fracture regimes in structural steels; at temperatures below the DBTT, failure tends to occur by low energy cleavage (brittle) fracture, while at temperatures above the DBTT, failure tends to occur by high energy ductile fracture.

high-performance: in regard to composites or fibers means having a tensile strength greater than about 3410 MPa (500 ksi) and a modulus greater than about 136054 MPa (20 msi);

INVAR: a material consisting essentially of iron and nickel;

ksi: thousand pounds per square inch;

LNG: liquefied natural gas at atmospheric pressure and about −162° C. (−260° F.);

$M_s$ transformation temperature: the temperature at which transformation of austenite to martensite starts during cooling;

msi: million pounds per square inch;

Non-load-bearing Liner Container Patent: U.S. Pat. No. 6,460,721;

PLNG: pressurized, liquefied natural gas at a pressure in the broad range of about 1035 kPa (150 psia) to about 7590 kPa (1100 psia) and at a temperature in the broad range of about −123° C. (−190° F.) to about −62° C. (−80° F.);

PLNG Patent: U.S. Pat. No. 6,085,528;

Process Component Patent: U.S. Pat. No. 6,212,891;

psi: pounds per square inch;

self-supporting: in regard to a liner means capable of maintaining its structural integrity while supporting its own weight;

ship block coefficient: V/(L)(B)(T) where V is the volume of fluid displaced by the ship, L is the length between the ship's perpendiculars, B is the ship's beam and T is the ship's draft;

$T_{nr}$ temperature: the temperature below which austenite does not recrystallize;

weldment: a welded joint, including: (i) the weld metal, (ii) the heat-affected zone (HAZ), and (iii) the base metal in the "near vicinity" of the HAZ. The portion of the base metal that is considered within the "near vicinity" of the HAZ, and therefore, a part of the weldment, varies depending on factors known to those skilled in the art, for example, without limitation, the width of the weldment, the size of the item that was welded, the number of weldments required to fabricate the item, and the distance between weldments.

We claim:

1. A container suitable for storing a pressurized fluid at a pressure of about 1035 kPa (150 psia) to about 7590 kPa (1100 psia) and at a temperature of about −123° C. (−190° F.) to about −62° C. (−80° F.), said container comprising:
   (a) a self-supporting liner, said self-supporting liner providing a substantially impermeable barrier to said pressurized fluid; and
   (b) a load-bearing vessel in contact with said self-supporting liner, said load-bearing vessel having been made from composite materials and being suitable for withstanding pressures of about 1035 kPa (150 psia) to about 7590 kPa (1100 psia) and temperatures of about −123° C. (−190° F.) to about −62° C. (−80° F.), and said composite materials having a coefficient of thermal expansion (i) that is substantially the same as the coefficient of thermal expansion of said self-supporting liner at the interface with said self-supporting liner, and (ii) that gradually decreases through the thickness of said load-bearing vessel as the distance from said interface increases.

2. A container according to claim 1 wherein said load-bearing vessel has an outermost overwrap layer consisting essentially of carbon fibers or of a material that provides similar creep performance as carbon fibers would provide.

3. A container according to claim 1 wherein said composite materials comprise an intermediate material at the interface with said self-supporting liner, wherein said intermediate material has adequate shear strength or strain to substantially prevent failure of said container during changes in temperature between ambient and about −123° C. (−190° F.).

4. A container according to claim 1 wherein said self-supporting liner is made of a material consisting essentially of aluminum and said composite materials comprising fibers selected from the group consisting of (i) carbon, (ii) glass, (iii) aramid, and (iv) Ultra-High Molecular Weight Polyethylene.

5. A container according to claim 1 wherein said self-supporting liner is made of a material consisting essentially of a steel having a yield strength of at least about 690 MPa (100 ksi) and a ductile to brittle transition temperature lower than about −62° C. (−80° F.) in the base material and in its heat-affected-zone after welding and said composite materials comprising fibers selected from the group consisting of (i) carbon, (ii) glass, (iii) aramid, and (iv) Ultra-High Molecular Weight Polyethylene.

6. A container for storing a pressurized fluid comprising:
 a self-supporting liner that provides a substantially impermeable barrier to a pressurized fluid; and
 composite material disposed adjacent to the self-supporting liner and having a coefficient of thermal expansion that is about the same as the coefficient of thermal expansion of the self-supporting liner at the interface with the self-supporting liner, and wherein the coefficient of thermal expansion gradually decreases as the distance from the interface increases in the composite material.

7. The container of claim 6 comprising an overwrap layer, the overwrap layer having one of carbon fibers, a material that provides similar creep performance as carbon fibers, and any combination thereof.

8. The container of claim 6 wherein the composite material comprising an intermediate material at the interface with the self-supporting liner, wherein the intermediate material is configured to provide shear strength that prevents failure of the composite material in a temperature range from ambient to about −123° C. (−190° F.).

9. The container of claim 6 wherein the self-supporting liner comprises aluminum.

10. The container of claim 6 wherein the self-supporting liner comprises steel having a yield strength of at least about 690 MPa (100 ksi) and a ductile to brittle transition temperature lower than about −62° C. (−80° F.).

11. The container of claim 6 wherein the pressurized fluid comprises pressurized liquefied natural gas.

12. The container of claim 11 wherein the self-supporting liner and composite material are configured to handle pressures of about 1035 kPa (150 psia) to about 7590 kPa (1100 psia).

13. The container of claim 11 wherein the self-supporting liner and composite material are configured to handle temperatures of about −123° C. (−190° F.) to about −62° C. (−80° F.).

14. The container of claim 6 wherein the composite material comprises fibers from at least one of carbon, glass, aramid, Ultra-High Molecular Weight Polyethylene, and any combination thereof.

15. A system for storing a pressurized fluid comprising:
 a transportation vessel;
 at least one container associated with the transportation vessel, the at least one container comprising:
  a self-supporting liner that provides a substantially impermeable barrier to a pressurized fluid; and
  composite material disposed adjacent to the self-supporting liner and having a coefficient of thermal expansion that is about the same as the coefficient of thermal expansion of the self-supporting liner at the interface with the self-supporting liner, and wherein the coefficient of thermal expansion gradually decreases as the distance from the interface increases in the composite material.

16. The system of claim 15 wherein the at least one container is disposed within the transportation vessel by a two point support system.

17. The system of claim 15 wherein the at least one container comprises a nozzle to allow access to the container for storing pressurized liquefied natural gas.

* * * * *